(12) United States Patent
Isshiki

(10) Patent No.: US 12,258,033 B2
(45) Date of Patent: Mar. 25, 2025

(54) OBJECT DETECTION SYSTEM AND OBJECT DETECTION METHOD

(71) Applicant: Sony Semiconductor Solutions Corporation, Kanagawa (JP)

(72) Inventor: Akitoshi Isshiki, Chiba (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 104 days.

(21) Appl. No.: 18/023,114

(22) PCT Filed: Sep. 14, 2021

(86) PCT No.: PCT/JP2021/033645
§ 371 (c)(1),
(2) Date: Feb. 24, 2023

(87) PCT Pub. No.: WO2022/070872
PCT Pub. Date: Apr. 7, 2022

(65) Prior Publication Data
US 2023/0365151 A1 Nov. 16, 2023

Related U.S. Application Data

(60) Provisional application No. 63/085,087, filed on Sep. 29, 2020.

(51) Int. Cl.
*B60W 50/14* (2020.01)
*B60W 40/08* (2012.01)
*G06V 20/56* (2022.01)

(52) U.S. Cl.
CPC ............ *B60W 50/14* (2013.01); *B60W 40/08* (2013.01); *G06V 20/56* (2022.01);
(Continued)

(58) Field of Classification Search
CPC ................. B60W 50/14; B60W 40/08; B60W 2540/225; B60W 2050/143; B60W 2050/146; B60W 2300/17; G06V 20/56
See application file for complete search history.

(56) References Cited

U.S. PATENT DOCUMENTS 10,412,354 B2 * 9/2019 Fujita ....................... B60Q 9/00
10,635,915 B1 * 4/2020 Kim ........................ G06F 18/24
(Continued)

FOREIGN PATENT DOCUMENTS

| CN | 102460536 A | 5/2012 |
|---|---|---|
| CN | 108583433 A | 9/2018 |

(Continued)

OTHER PUBLICATIONS

International Search Report (PCT/ISA/210), International Application No. PCT/JP2021/035645, dated Nov. 30, 2021.

*Primary Examiner* — Chico A Foxx
(74) *Attorney, Agent, or Firm* — Michael Best & Friedrich LLP

(57) ABSTRACT

Object detection systems and methods are disclosed. In one example, an object detection system holds blind spot information about a blind spot area of a driving target. An information acquisition unit acquires surroundings situation information about a surrounding situation of the driving target, a detection processing unit detects an object based on the surroundings situation information, a state determination unit determines that the object is in a dangerous state where the object is in the blind spot area, based on position information of the object detected and the blind spot information, and a notification unit notifies a driver of the driving target and/or surroundings around the driving target that the object is in the dangerous state.

18 Claims, 10 Drawing Sheets

(52) U.S. Cl.
CPC . *B60W 2050/143* (2013.01); *B60W 2050/146* (2013.01); *B60W 2300/17* (2013.01); *B60W 2540/225* (2020.02)

(56) References Cited

U.S. PATENT DOCUMENTS

| | | | |
|---|---|---|---|
| 2007/0126564 A1* | 6/2007 | Lee | B60Q 9/007 |
| | | | 340/435 |
| 2010/0023264 A1* | 1/2010 | G. | G01C 23/00 |
| | | | 701/301 |
| 2010/0049393 A1* | 2/2010 | Emam | G06N 5/02 |
| | | | 701/31.4 |
| 2011/0254700 A1* | 10/2011 | Gharsalli | G08G 1/165 |
| | | | 340/904 |
| 2015/0217691 A1* | 8/2015 | Tanuki | E02F 9/261 |
| | | | 348/148 |
| 2015/0326829 A1* | 11/2015 | Kurihara | B60R 1/27 |
| | | | 348/148 |
| 2015/0343976 A1* | 12/2015 | Lim | E02F 9/261 |
| | | | 340/435 |
| 2016/0236616 A1* | 8/2016 | Kurihara | G06V 20/58 |
| 2018/0174458 A1* | 6/2018 | Miller | G08G 1/166 |
| 2018/0192019 A1* | 7/2018 | Fujita | B60Q 9/00 |
| 2019/0266421 A1* | 8/2019 | Kim | H04N 7/188 |
| 2020/0290637 A1* | 9/2020 | Schonert | G06V 20/58 |
| 2021/0065550 A1* | 3/2021 | Yang | G08G 1/164 |
| 2021/0094541 A1* | 4/2021 | Kurasawa | G06V 10/95 |
| 2021/0246631 A1* | 8/2021 | Kurosawa | G06V 40/113 |
| 2022/0198809 A1* | 6/2022 | Oami | B60W 50/14 |
| 2023/0011758 A1* | 1/2023 | Okajima | E02F 9/261 |
| 2023/0365151 A1* | 11/2023 | Isshiki | H04N 7/18 |

FOREIGN PATENT DOCUMENTS

| | | | | |
|---|---|---|---|---|
| CN | 110930657 A | | 3/2020 | |
| CN | 213112393 U | * | 5/2021 | |
| CN | 115359651 A | * | 11/2022 | G08G 1/0104 |
| JP | 2018197491 A | | 12/2018 | |
| JP | 2019024196 A | | 2/2019 | |
| WO | 2020091002 A1 | | 5/2020 | |

* cited by examiner

OBJECT DETECTION SYSTEM AND OBJECT DETECTION METHOD

FIELD

The present disclosure relates to an object detection system and an object detection method.

BACKGROUND

Construction machines (also including heavy machines) such as an excavator and a bulldozer, and vehicles such as a forklift and an automobile become driving targets (driving target machines) that are driven by drivers. Of these driving targets, an excavator has been developed to have a sensor that detects an object such as a person or a thing being around the excavator (see, e.g., Patent Literature 1).

CITATION LIST

Patent Literature

Patent Literature 1: JP 2018-197491 A

SUMMARY

Technical Problem

However, it is difficult for a driver to visually recognize the object (e.g., person, animal, obstacle, or the like) being at the position of a blind spot to such a driving target, and it is also difficult for the person being around the driving target to grasp that the person is being at the blind spot to the driving target. Therefore, it is desired to notify both or one of the driver and the surroundings around the driving target that the object is at the position of the blind spot to the driving target.

Therefore, the present disclosure proposes an object detection system and an object detection method that are configured to notify both or one of a driver and surroundings around a driving target that an object is at the position of a blind spot to the driving target.

Solution to Problem

An object detection system according to the embodiment of the present disclosure includes: an information holding unit that holds blind spot information about a blind spot area being a blind spot of a driving target being a construction machine or a vehicle; an information acquisition unit that acquires surroundings situation information about a surrounding situation of the driving target; a detection processing unit that detects an object based on the surroundings situation information; a state determination unit that determines that the object is in a dangerous state where the object is in the blind spot area, based on position information of the object detected and the blind spot information; and a notification unit that notifies both or one of a driver who drives the driving target and surroundings around the driving target that the object is in the dangerous state, according to a result of determination that the object is in the dangerous state.

An object detection method according to the embodiment of the present disclosure includes: holding blind spot information about a blind spot area being a blind spot of a driving target being a construction machine or a vehicle; acquiring surroundings situation information about a surrounding situation of the driving target; detecting an object based on the surroundings situation information; determining that the object is in a dangerous state where the object is in the blind spot area, based on position information of the object detected and the blind spot information; and notifying both or one of a driver who drives the driving target and surroundings around the driving target that the object is in the dangerous state, according to a result of determination that the object is in the dangerous state.

DESCRIPTION OF EMBODIMENTS

Figure 1:
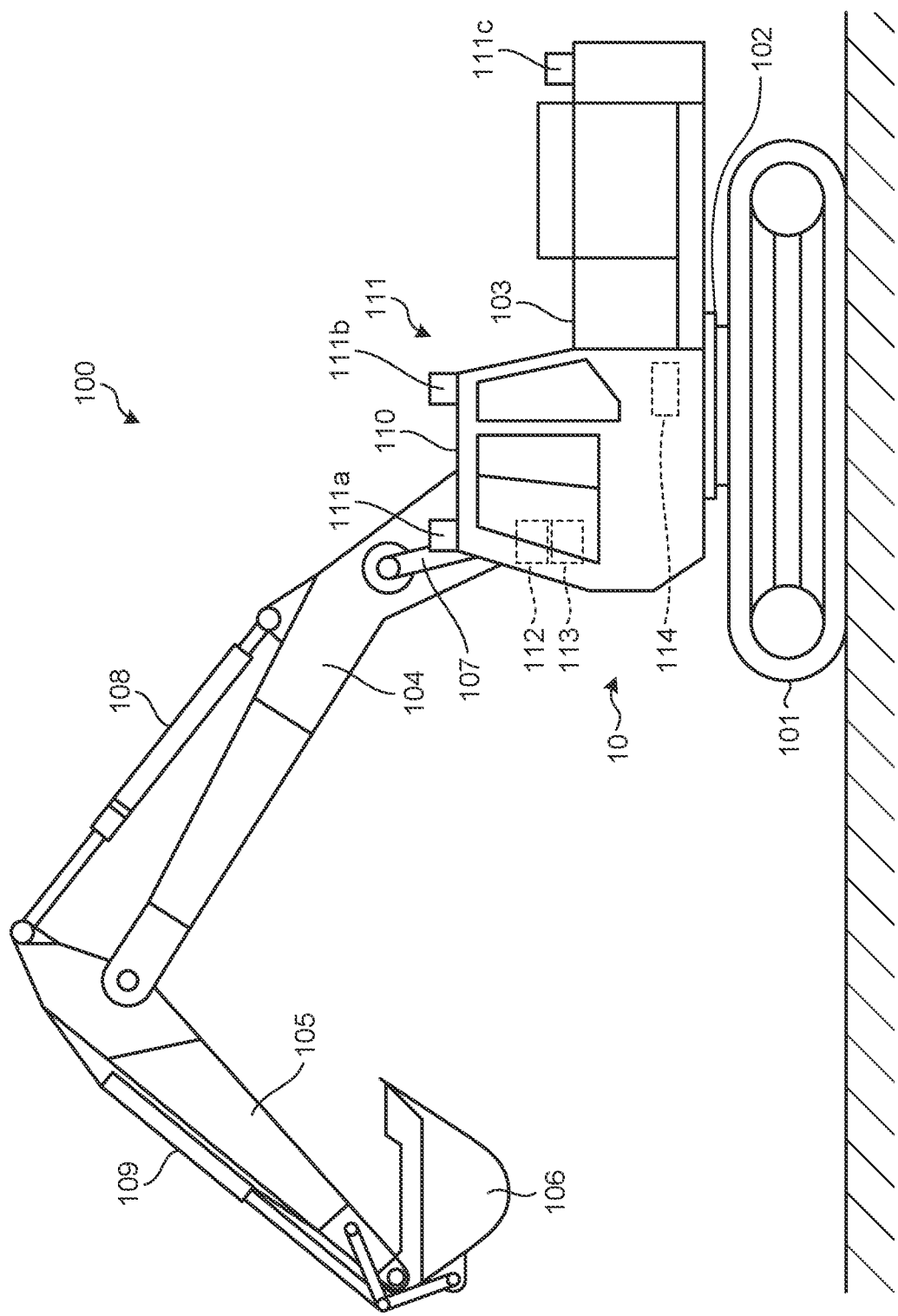
FIG. 1 is a diagram illustrating an example of a schematic configuration of an excavator according to a first embodiment.

The embodiments of the present disclosure will be described in detail below with reference to the drawings. Note that devices, a system, a method, and the like according to the present disclosure are not limited by the embodiments. Furthermore, in the following embodiments, the same portions are denoted by the same reference numerals or symbols, and repetitive description thereof will be omitted.

One or more embodiments (including examples and modifications) which are described below can be implemented independently. Meanwhile, in the embodiments described below, at least some of the embodiments may be appropriately combined with at least some of other embodiments. These embodiments may include novel features different from each other. Therefore, the embodiments can contribute to solving different objects or problems, and can have different effects.

Furthermore, the present disclosure will be described in the order of items shown below.

1. First Embodiment
1-1. Exemplary configuration of excavator
1-2. Exemplary configuration of object detection system
1-3. Examples of blind spot
1-4. Example of notification display
1-5. Example of object detection process
1-6. Example of notification process
1-7. Functions and effects
2. Second Embodiment
2-1. Exemplary configuration of object detection system
2-2. Example of blind spot information update process
2-3. Example of specific operation stop process
2-4. Example of surroundings situation information transmission process
2-5. Example of surroundings situation information reception process
2-6. Functions and effects
3. Other Embodiments
4. Exemplary hardware configuration
5. Supplementary note

1. FIRST EMBODIMENT

1-1. Exemplary Configuration of Excavator

An exemplary configuration of an excavator 100, which is an example of a construction machine, according to the present embodiment will be described with reference to FIG. 1. FIG. 1 is a diagram illustrating an example of a schematic configuration of the excavator 100 according to the present embodiment.

As illustrated in FIG. 1, the excavator 100 includes a carriage 101, a swing mechanism 102, a swing body 103, a boom 104, an arm 105, a bucket 106, a boom cylinder 107, an arm cylinder 108, a bucket cylinder 109, and a cabin 110. The excavator 100 is provided with an object detection system 10 according to the present embodiment. The object detection system 10 is a system that detects an object (e.g., person, thing, or the like) being around the excavator 100 (details will be described later).

The carriage 101 is positioned under the excavator 100. The swing body 103 is mounted above the carriage 101 via the swing mechanism 102. The boom 104 is mounted to the swing body 103, the arm 105 is mounted to an end of the boom 104, and the bucket 106 is mounted to an end of the arm 105. The boom 104, the arm 105, and the bucket 106 constitute an excavation attachment, and are hydraulically driven by the boom cylinder 107, the arm cylinder 108, and the bucket cylinder 109, respectively. Furthermore, the cabin 110 and a power source such as an engine are mounted on the swing body 103.

The cabin 110 and the swing body 103 each have an upper portion to which an imaging unit 111 is mounted. The imaging unit 111 is implemented by, for example, a plurality of cameras 111a, 111b, and 111c. These cameras 111a, 111b, and 111c are arranged so as to image the whole periphery of the excavator 100 (e.g., in all directions). In the example of FIG. 1, the imaging unit 111 includes the three cameras 111a, 111b, and 111c so as to image at least a blind spot area of the excavator 100, but the number the cameras is not limited.

On the inside of the cabin 110, an input unit 112, an output unit 113, a controller 114, and the like are installed. The input unit 112 is a device that receives an input operation from an operator such as a driver, and is implemented by, for example, an operation unit (an operation lever, an operation pedal, etc.), a gate lock lever, a button provided at an end of the operation unit, a button provided at a display, a touch panel, or the like. The output unit 113 is a device that outputs various information, and is implemented by, for example, a display, speaker, buzzer, lamp, or the like. The controller 114 is a device that controls driving of respective portions of the excavator 100, and is implemented by, for example, a processor such as a central processing unit (CPU) or a micro processing unit (MPU).

Here, the excavator 100 has been described as the example of the construction machine on which the object detection system 10 is mounted, but the present invention is not limited thereto. Examples of the driving target driven by the driver include construction machines (including heavy machines) such as a bulldozer and a crane, and vehicles such as a forklift and an automobile, in addition to the excavator 100. Note that automobiles such as a truck, dump truck, and trailer may be sometimes classified into a transport machine that is a type of construction machine. Furthermore, the vehicle such as the forklift may be classified into an industrial vehicle, in some cases.

1-2. Exemplary Configuration of Object Detection System

Figure 2:
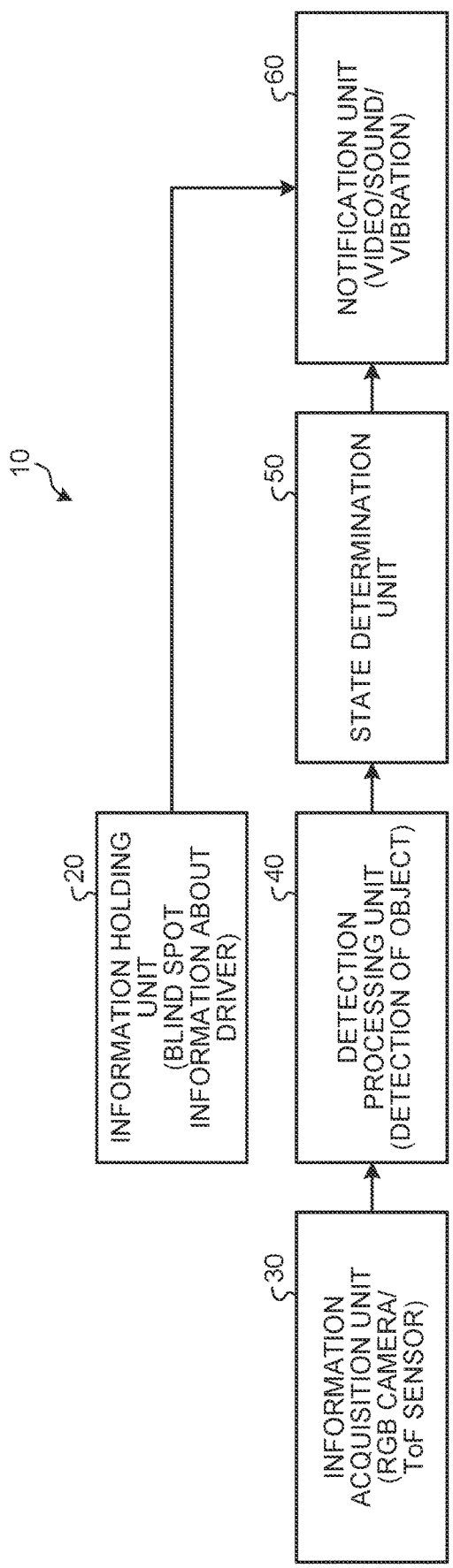
FIG. 2 is a diagram illustrating an example of a schematic configuration of an object detection system according to the first embodiment.

An exemplary configuration of the object detection system 10 according to the present embodiment will be described with reference to FIG. 2. FIG. 2 is a diagram illustrating an example of a schematic configuration of the object detection system 10 according to the present embodiment.

As illustrated in FIG. 2, the object detection system 10 includes an information holding unit 20, an information acquisition unit 30, a detection processing unit 40, a state determination unit 50, and a notification unit 60.

The information holding unit 20 holds blind spot information about the blind spot area that is a blind spot of the excavator 100 being an example of the construction machine. The information holding unit 20 is implemented by, for example, a storage medium such as a flash memory or a solid state drive (SSD), or a server device such as a cloud server connected via a network. The blind spot information is held by the information holding unit 20. Note that the information holding unit 20 may not hold the blind spot information set in advance, and, for example, may acquire the blind spot information on the basis of image information from the imaging unit 111 and hold the blind spot information.

Here, the blind spot of the excavator 100 is set, for example, on the basis of a mirror position for confirming the surroundings around the excavator 100, the structure or the shape of the excavator 100, or the like, and is set according to a predetermined movement of the excavation attachment (the boom 104, the arm 105, and the bucket 106) of the excavator 100, the cabin 110, or the like. The blind spot area (e.g., three-dimensional area or two-dimensional area) related to the blind spot is stored in the information holding unit 20, as the blind spot information.

The information acquisition unit 30 acquires surroundings situation information about the surrounding situation of the excavator 100. The information acquisition unit 30 includes, for example, the cameras 111a, 111b, and 111c (see FIG. 1) each having a sensor that detects the surrounding situation of the excavator 100. The sensor is, for example, an image sensor, such as a vision sensor or a distance measuring sensor. The vision sensor is implemented by, for example, a color sensor such as an RGB sensor, and the distance measuring sensor is implemented by, for example, a time of flight (ToF) sensor. The surroundings situation information includes, for example, both or one of the image information and distance measurement information. Note that the sensor may be implemented by, for example, a motion sensor using infrared rays or the like, in addition to the image sensor, or may be implemented by combining the vision sensor, the distance measuring sensor, the motion sensor, and the like. In this configuration, the surroundings situation information includes the image information obtained by the motion sensor.

The detection processing unit 40 detects the object (e.g., person, animal, obstacle, or the like) on the basis of the surroundings situation information (e.g., image information, distance measurement information, or the like) and acquires information (e.g., position information, type information, or the like of the object) about a position, a type, or the like of the object. The position information of the object is, for example, information (e.g., three-dimensional coordinates, two-dimensional coordinates, or the like) indicating the position of the object in the three-dimensional area or two-dimensional area. Furthermore, the type information of the object is, for example, information indicating whether the object is the person or the thing other than the person, or indicating whether the object is the animal, the obstacle, or the like when the object is the thing other than the person. Examples of the obstacle include an obstacle that breaks the construction machine upon collision, or an obstacle that is not desired to be broken, such as a power pole or a structure. The detection processing unit 40 is implemented by, for example, an arithmetic device having an algorithm for detecting a target object such as the person or the thing, from input information by using a machine learning technology such as deep learning. This arithmetic device is implemented by, for example, a CPU in a sensor module, a graphics processing unit (GPU) connected to the sensor module, or the like. Note that, for the algorithm for detecting the object detection, for example, region based/with convolutional neural networks (R-CNN), you only look once (YOLO), single shot multibox detector (SSD), or the like may be used.

For example, the detection processing unit 40 detects the object from a captured image and identifies the type of the detected object. At this time, the detection processing unit 40 uses the machine learning technology such as deep learning to detect the target object such as the person or the thing from the input information, and performs identification. This process of detection may be performed stepwise. For example, the object may be detected and identified in a preceding process, and the correctness of the identification of the object may be determined in a subsequent process. Furthermore, a person candidate may be extracted from the detected object, thereafter identifying the extracted person candidate as the person. In this configuration, in the preceding process, for example, the person candidate is extracted by image processing of extracting a simple feature based on a local brightness gradient or edge, a geometric feature by Hough transform or the like, a feature related to an area or aspect ratio of a region divided on the basis of brightness, and the like. In the subsequent process, for example, it is identified whether the person candidate is the person by image processing such as image recognition processing using an image feature description represented by histograms of oriented gradients (HOG) features and a classifier generated by machine learning.

The state determination unit 50 determines that the object is in a dangerous state where the object is in the blind spot area, on the basis of the position information of the object and the blind spot information. For example, the state determination unit 50 uses a position of the detected target object and a blind spot position obtained from the blind spot information held by the information holding unit 20 to determine whether the object is in the dangerous state where the object is in the blind spot area on the basis of a positional relationship between the target object and the blind spot. The state determination unit 50 is implemented, for example, by an arithmetic device that performs determination on the basis of a positional relationship and overlapping condition between coordinate information of the blind spot and coordinate information of the object, or by an arithmetic device that has software performing determination with an algorithm using the machine learning technology such as deep learning. This arithmetic device is implemented by, for example, a CPU in a sensor module, a graphics processing unit (GPU) connected to the sensor module, or the like.

Here, the dangerous state includes, but is not limited to, a state where the object is in the blind spot area. For example, the dangerous state may include one or both of a state where the object is within a predetermined distance from the driving target being the construction machine or the vehicle and a state where the driving target is approaching the object, in addition to a state where the object is in the blind spot area. In this configuration, the state determination unit 50 obtains a separation distance between the object and the excavator 100 from the position information or the distance measurement information about the object, and, on the basis of the obtained separation information, determines that the object is within the predetermined distance or that the driving target is approaching the object. Shorter separation distance represents approaching of the driving target to the object.

The notification unit 60 notifies one or both of the driver and the surroundings around the excavator 100, of the dangerous state of the object, according to a result of determination that the object exists in the blind spot area. For example, the notification unit 60 alerts both or one of the driver and the surroundings around the excavator 100 (e.g., a person in the blind spot area or other surrounding people, etc.) with video (image), light, sound, or vibration. The notification unit 60 includes, for example, the output unit 113 (see FIG. 1). For example, the notification unit 60 may perform visual notification by the display, or may perform notification by flashing of a lamp, sound from a speaker, or vibration of a seat, a steering wheel, or the like. The display is provided, for example, near a driver's seat in the cabin 110 of the excavator 100. Furthermore, the lamp, the speaker, and the like are provided, for example, inside or outside the cabin 110 of the excavator 100.

Note that the notification unit 60 causes the display, which is the example of the output unit 113, to display an image even at the time at which the alert is not issued. The display image is, for example, a viewpoint conversion image, a through-the-lens image, or the like that is obtained by the imaging unit 111. The viewpoint conversion image is a bird's-eye view image (image viewed from a virtual viewpoint directly above the excavator 100) obtained by combining the individual captured images of the cameras 111*a*, 111*b*, and 111*c*. The through-the-lens image is an image obtained by capturing a scene viewed in a direction in which each of the cameras 111*a*, 111*b*, and 111*c* is directed, from each position of the cameras 111*a*, 111*b*, and 111*c*, and the through-the-lens image includes, for example, an image not subjected to viewpoint conversion processing. In addition, the notification unit 60 switches the images displayed by the display according to an instruction input by the driver or the like via the input unit 112 such as a touch panel or a switch.

Here, each block constituting the object detection system 10 is, for example, a functional block that represents a function of the object detection system 10 (the same applies to other embodiments). These functional blocks may be software blocks or hardware blocks. For example, each of the functional blocks described above may be one software module implemented by software (including a microprogram) or one circuit block on a semiconductor chip (die). As a matter of course, each functional block may be one processor or one integrated circuit. The object detection system 10 may be configured by functional units different from the functional blocks described above, and any method of constituting the functional blocks may be used. In addition, operations of some or all of the blocks constituting the object detection system 10 may be performed by another device (e.g., a server device or the like connected via a network). Note that the processor is, for example, a processor such as a CPU or an MPU. In addition, the integrated circuit is a circuit such as an application specific integrated circuit (ASIC) or a field programmable gate array (FPGA).

1-3. Examples of Blind Spot

Figure 3:
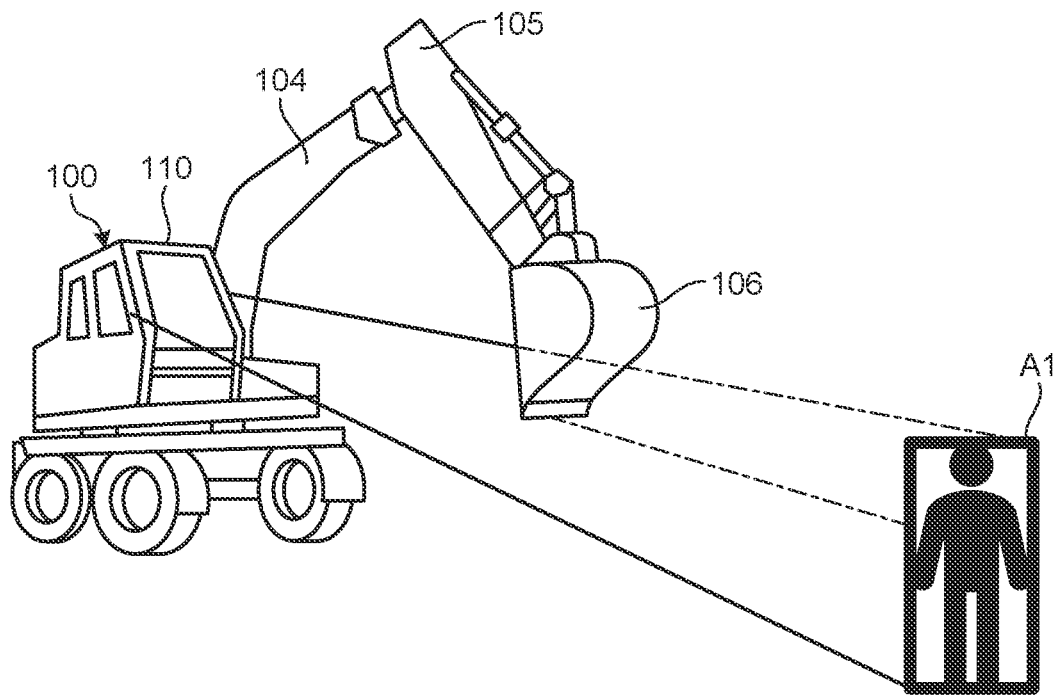
FIG. 3 is a diagram illustrating an example of a blind spot according to the first embodiment.
Figure 4:
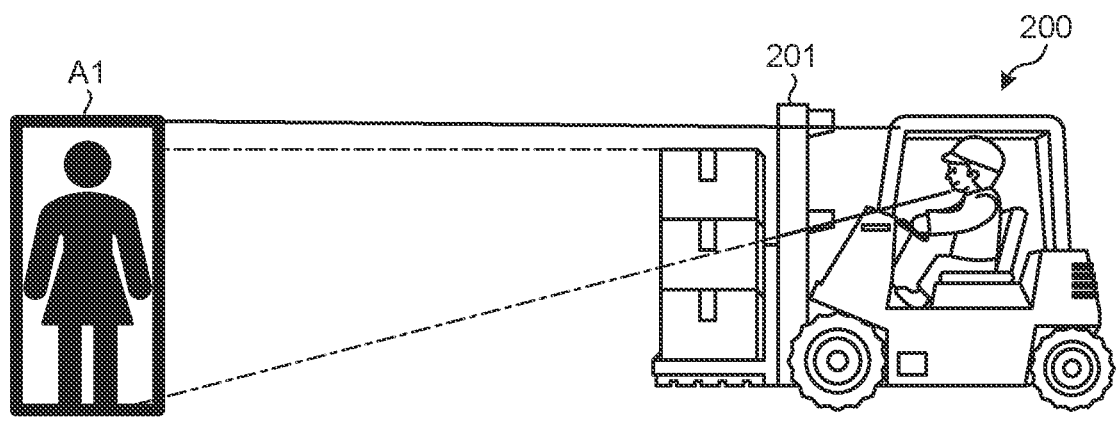
FIG. 4 is a diagram illustrating an example of a blind spot according to the first embodiment.

An example of the blind spot according to the present embodiment will be described with reference to FIGS. 3 and 4. FIGS. 3 and 4 are each a diagram illustrating an example of the blind spot according to the present embodiment. The example of FIG. 3 illustrates an example of the blind spot of the excavator 100, and the example of FIG. 4 illustrates an example of the blind spot of a forklift 200.

As illustrated in FIG. 3, a space in front of the arm 105, the bucket 106, or the like of the excavator 100 becomes the blind spot to a driver of the excavator 100. The driver who sits in the driver's seat in the cabin 110 and drives the excavator 100 may not notice the object in the blind spot. Meanwhile, the imaging unit 111 images the blind spot area, the object in the blind spot is thereby imaged by the imaging unit 111 and detected by the detection processing unit 40, and the notification unit 60 notifies that the object is in the dangerous state where the object is in the blind spot area. This configuration makes it possible for the driver to grasp that the object is in the blind spot area around the excavator 100. Note that in the example of FIG. 3, a detection area A1 of the object has a two-dimensional rectangular shape, but may be set in a three-dimensional rectangular parallelepiped shape.

As illustrated in FIG. 4, a space in front of a plurality of packages (e.g., cardboard boxes) or the like loaded on a lift 201 of the forklift 200 becomes the blind spot to a driver of the forklift 200. Note that the object detection system 10 is applied to the forklift 200 as in the excavator 100. The driver who sits on a driver's seat of the forklift 200 and drives the forklift 200, may not notice the object in the blind spot. Meanwhile, as in the excavator 100, an imaging unit (e.g., see the imaging unit 111) is provided at an upper portion of the forklift 200, the imaging unit images the blind spot area, the object in the blind spot is thereby imaged by the imaging unit 111 and detected by the detection processing unit 40, and the notification unit 60 notifies that the object is in the dangerous state where the object is in the blind spot area. This configuration makes it possible for the driver to grasp that the object is in the blind spot area around the forklift 200. Note that in the example of FIG. 4, as in the example of FIG. 3, the detection area A1 of the object has a two-dimensional rectangular shape, but may be set in a three-dimensional rectangular parallelepiped shape.

(Supplements to Blind Spot Information)
Here, examples of the excavator 100, the forklift 200, and the wheel loader will be described as supplements to the blind spot information.
(Example of Excavator 100)
The blind spot information may include, for example, the blind spot area that dynamically changes according to a control state (e.g., stop state, operating state, or the like) of the arm 105, movement related to rotation (swing) of the cabin 110 that is a portion having the driver's seat at an upper portion of the vehicle, or the like, in addition to an invisible area due to the shape/structure of the vehicle. For the blind spot area that dynamically changes, a calculation formula for calculation of the blind spot area from a position/control state of the arm 105, a state (angle) of the driver's seat, and the like, a calculation formula for calculation of the blind spot area from an attitude of the vehicle on the basis of the shape/structure of the vehicle, and the like are used. The blind spot information is obtained by these calculation formulas. Note that a change/movement of the blind spot area according to a head position (e.g., sitting height, posture, and the like) of the driver may also be considered.
(Example of Forklift 200)
The blind spot information may include information about the blind spot area that is the blind spot depending on a control state of rising/lowering (e.g., stopped state, operating state, or the like) of the lift 201, in addition to the blind spot area that is the blind spot to the driver, due to the structure of the vehicle. For the blind spot depending on the control state of the lift 201, a calculation formula for calculation of the blind spot area on the basis of lift/vehicle control information is used. The blind spot information is obtained by this calculation formula.
(Example of Wheel Loader)
The blind spot information may include information about the blind spot area that is the blind spot depending on a control state of rising/lowering (e.g., stopped state, operating state, or the like) of the bucket, in addition to the blind spot area that is the blind spot to the driver, due to the structure of the vehicle. For the blind spot depending on the control state of the bucket, a calculation formula for calculation of the blind spot area on the basis of bucket/vehicle control information is used. The blind spot information is obtained by this calculation formula.

1-4. Example of Notification Display

Figure 5:
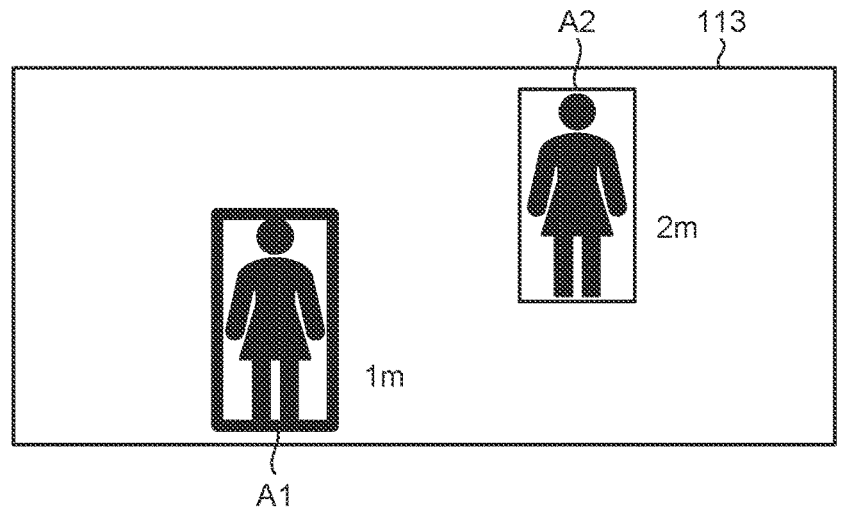
FIG. 5 is a diagram illustrating an example of notification display according to the first embodiment.

An example of notification display according to the present embodiment will be described with reference to FIG. 5. FIG. 5 is a diagram illustrating the example of the notification display according to according to the present embodiment.

As illustrated in FIG. 5, the display that is an example of the output unit 113 displays persons in the blind spot of the excavator 100. In the example of FIG. 5, two persons are detected and displayed as the persons who are in the blind spot of the excavator 100, and the edges of the detection areas A1 and a detection area A2 of the two respective persons are represented by square frames. At this time, the level of notification to the driver is changed according to the separation distance between the excavator 100 and the person. For example, the square frame of the detection area A1 of a person who has a short separation distance from the excavator 100, of the two persons is made thicker than the square frame of the detection area A2 of a person who has a long separation distance from the excavator 100, and is shown outstandingly compared with the other one. Furthermore, the separation distances such as "1 m" and "2 m" are indicated next to the square frames. At this time, the state determination unit 50 determines that the person who has the short separation distance from the excavator 100, that is, the person closer to the excavator 100 has a high level of danger than the person far from the excavator 100.

Note that in order to change the level of notification to the driver, in addition to changing the thickness of the square frame, the color or shape of the square frame, the thickness of a numeral indicating the separation distance, and the like may be changed, or the frame or the numeral of the separation distance may be blinked. Furthermore, in a case where the output unit 113 includes a device using light, sound, or vibration, the intensity of the light, sound, or vibration may be changed according to the separation distance between the excavator 100 and the object. For example, the light, sound, or vibration may be made stronger as the separation distance becomes shorter, or an output interval thereof may be made shorter.

When the display image as illustrated in FIG. 5 is visually recognized by the driver, the driver recognizes the two persons in the blind spot around the excavator 100, and further grasps the person closer to the excavator 100 of the two persons with awareness. Thereafter, when the persons move, the detection areas A1 and A2, that is, the square frames also moves following the movement of the persons. At this time, when the separation distance between each person and the excavator 100 changes according to the movement of the person, the numeral (In the example of FIG. 5, each of "1 m" and "2 m") of the separation distance shown next to the square frame also changes. In addition, when the person closest to the excavator 100 is switched between the two persons, the square frames are also switched in thickness. In other words, the square frame corresponding to the person closest to the excavator 100 is made thickest. Note that, in addition to making the square frame corresponding to the person closest to the excavator 100 thickest, all of the square frames corresponding to the persons who have separation distances from the excavator 100 equal to or less than a predetermined threshold may be made thick.

As described above, the persons in the blind spot area around the excavator 100 are displayed by the display, and further are indicated by the square frames on the display, making it possible to notify the driver of presence of the persons in the blind spot around the excavator 100, that is, of the dangerous states of the persons. Furthermore, changing the level of notification to the driver according to the separation distance between the excavator 100 and the person makes it possible to outstandingly show a person closer to the excavator 100. This configuration makes it possible to notify the driver of the presence of the person in the blind spot area of the excavator 100, making the driver aware of the person closer to the excavator 100, thus appropriately notifying the driver of the dangerous state of the person.

Note that, in the determination of the level of danger, the level of danger of the object is determined on the basis of the separation distance between the excavator 100 and the object, but the present invention is not limited thereto. For example, the level of danger of the object may be determined on the basis of whether the object is positioned on a flow line of movement of the excavator 100. At this time, when the object is positioned on the flow line, it is determined that the object has a high level of danger.

1-5. Example of Object Detection Process

Figure 6:
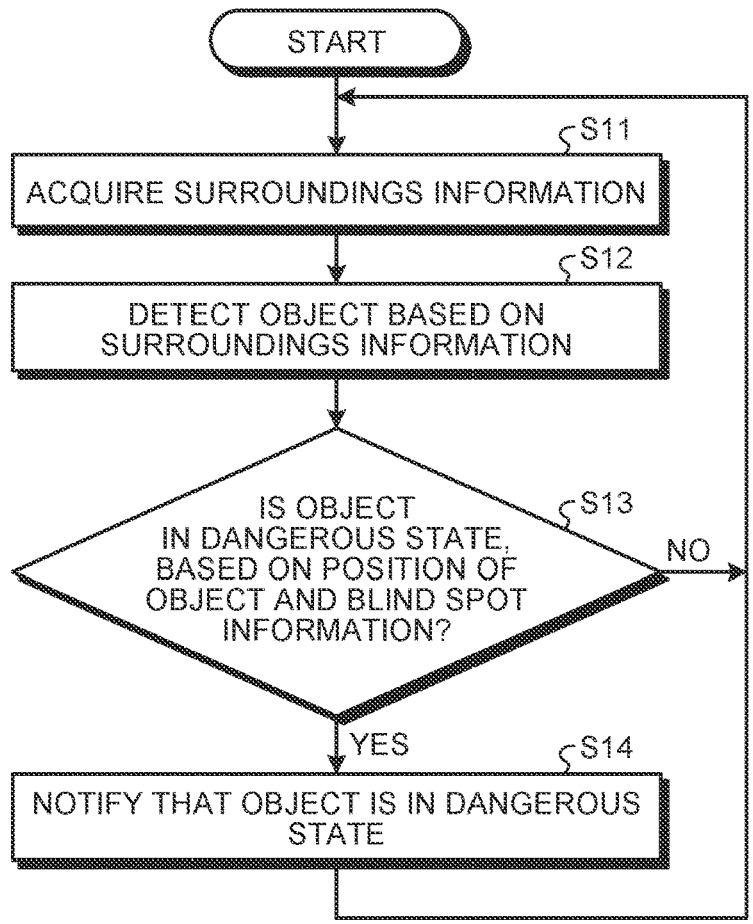
FIG. 6 is a flowchart illustrating an example of an object detection process according to the first embodiment.

An example of an object detection process according to the present embodiment will be described with reference to FIG. 6. FIG. 6 is a flowchart illustrating an example of the object detection process according to the present embodiment.

As illustrated in FIG. 6, in Step S11, the information acquisition unit 30 acquires the surroundings situation information. In Step S12, the detection processing unit 40 detects the object on the basis of the surroundings situation information. In Step S13, the state determination unit 50 determines whether the object is in the dangerous state where the object is in the blind spot area, on the basis of the position information of the object and the blind spot information. When the state determination unit 50 determines that the object is in the dangerous state (Yes in Step S13), the notification unit 60 notifies that the object is in the dangerous state in Step S14. On the other hand, when the state determination unit 50 determines that the object is not in the dangerous state (No in Step S13), the process returns to Step S11.

According to such object detection process, when the object is in the dangerous state where the object is in the blind spot area, the notification unit 60 notifies, for example, the driver or the surroundings around the excavator 100 (e.g., the person in the blind spot area or other surrounding persons, or the like) that the object is in the dangerous state. In this manner, it is possible to notify both or one of the driver and the surroundings around the driving target that the object is in the dangerous state.

1-6. Example of Notification Process

Figure 7:
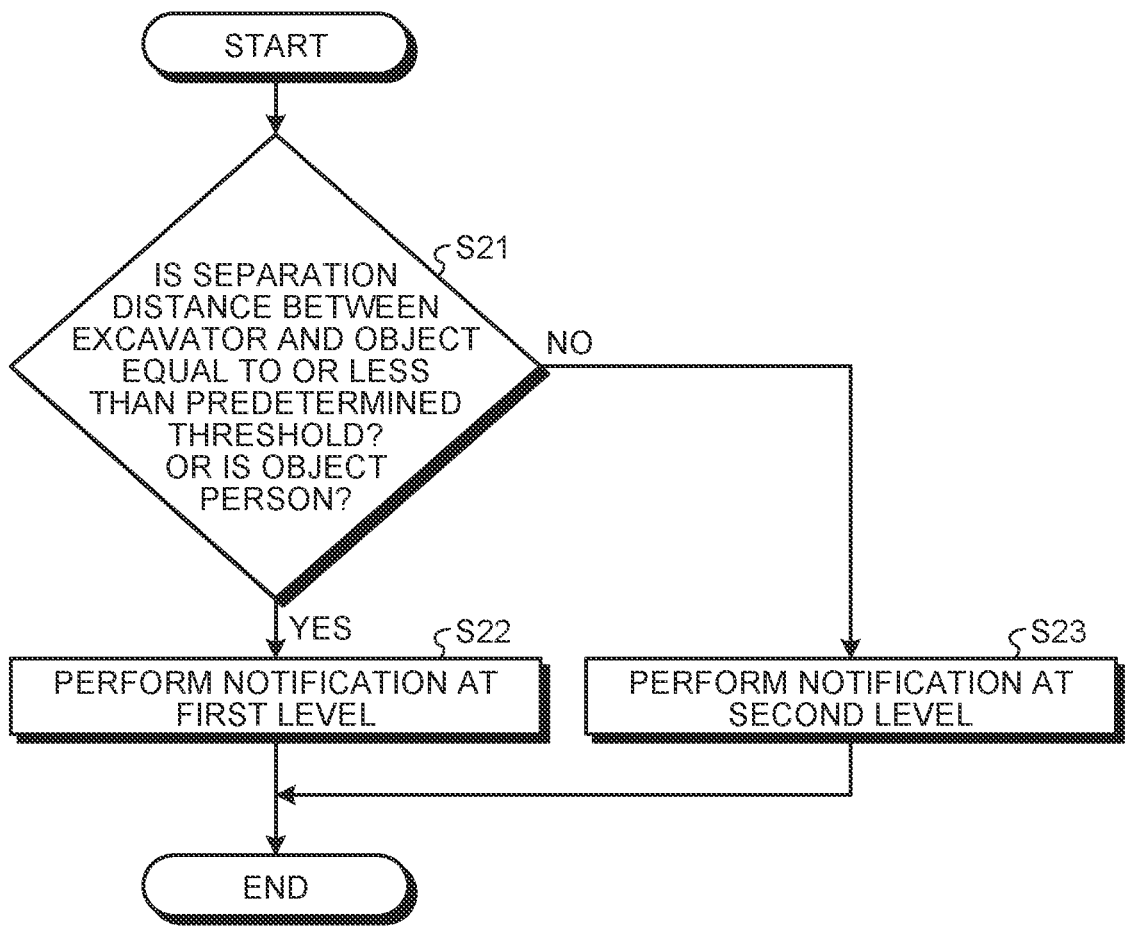
FIG. 7 is a flowchart illustrating an example of a notification process according to the first embodiment.

An example of a notification process according to the present embodiment will be described with reference to FIG. 7. FIG. 7 is a flowchart illustrating an example of the notification process according to the present embodiment.

As illustrated in FIG. 7, in Step S21, the state determination unit 50 determines whether the separation distance between the excavator 100 and the object is equal to or less than the predetermined threshold, or whether the object is the person. When the state determination unit 50 determines that the separation distance between the excavator 100 and the object is equal to or less than the predetermined threshold or determines that the object is the person (Yes in Step S21), the notification unit 60 gives notification at a first level in Step S22. On the other hand, when the state determination unit 50 determines that the separation distance between the excavator 100 and the object is not equal to or less than the predetermined threshold or determines that the object is not the person (No in Step S21), the notification unit 60 gives notification at a second level in Step S23. The first level is a level that is stronger than the second level.

According to such notification process, the level of notification of the object is changed according to whether the separation distance between the excavator 100 and the object is equal to or less than the predetermined threshold or whether the object is the person. For example, when the separation distance between the excavator 100 and the object is equal to or less than the predetermined threshold or when the object is the person, the level of notification of the object is raised as compared with when the separation distance between the excavator 100 and the object is not equal to or less than the predetermined threshold or when the object is not the person. This configuration makes it possible emphasize the object closer to the excavator 100 or the object being the person, thus, making the driver aware of the object.

Note that the example of FIG. 5 is an image example in which display of the frame, the numeral, or the like is intensified by processing of changing the level of notification according to whether the separation distance between the excavator 100 and the object is equal to or less than the predetermined threshold in Step S21 described above.

1-7. Functions and Effects

As described above, according to the present embodiment, the object detection system 10 includes the information holding unit 20 that holds the blind spot information about the blind spot area being a blind spot of the driving target (e.g., excavator 100) being the construction machine or the vehicle, the information acquisition unit 30 that acquires the surroundings situation information about the surrounding situation of the driving target, the detection processing unit 40 that detects the object (e.g., person, thing, or the like) on the basis of the surroundings situation information, the state determination unit 50 that determines that the object is in the dangerous state where the object is in the blind spot area, on the basis of the position information of the detected object and the blind spot information, and the notification unit 60 that notifies both or one of the driver and the surroundings around the driving target that the object is in the dangerous state, according to the result of determination that the object is in the dangerous state. This configuration makes it possible for the notification unit 60 to notify both or one of the driver and the surroundings around the driving target that the object is in the dangerous state, according to the object being in the dangerous state where the object is in the blind spot area. Therefore, it is possible to notify both or one of the driver and the surroundings around the driving target that the object is at the position of the blind spot of the driving target.

In addition, the dangerous state may include a state where the object is within the predetermined distance from the driving target, in addition to the state where the object is in the blind spot area. This configuration makes it possible to notify that the object is in the dangerous state, according to the situation where the object is within the predetermined distance from the driving target.

Furthermore, the dangerous state may include the state where the driving target is approaching the object, in addition to the state where the object is in the blind spot area. This configuration makes it possible to notify that the object is in the dangerous state, according to the situation where the driving target is approaching the object.

Furthermore, the notification unit 60 may change the level of notification representing that the object is in the dangerous state, according to the separation distance between the driving target and the object. This configuration makes it possible to increase the level of notification can be raised, for example, when the separation distance between the driving target and the object is short, as compared with when the separation distance between the driving target and the object is long. Therefore, the level of notification representing that the object is in the dangerous state can be changed according to the separation distance between the driving target and the object, thus achieving appropriate notification.

In addition, the notification unit 60 may change the level of notification representing that the object is in the dangerous state, according to whether the object is the person or other than the person (e.g., animals, obstacles, or the like). This configuration makes it possible increase the level of notification, for example, when the object is the person, as compared with when the object is other than the person. Therefore, the level of notification representing that the object is in the dangerous state can be changed according to whether the object is the person or other than the human, thus achieving appropriate notification.

2. SECOND EMBODIMENT

2-1. Exemplary Configuration of Object Detection System

Figure 8:
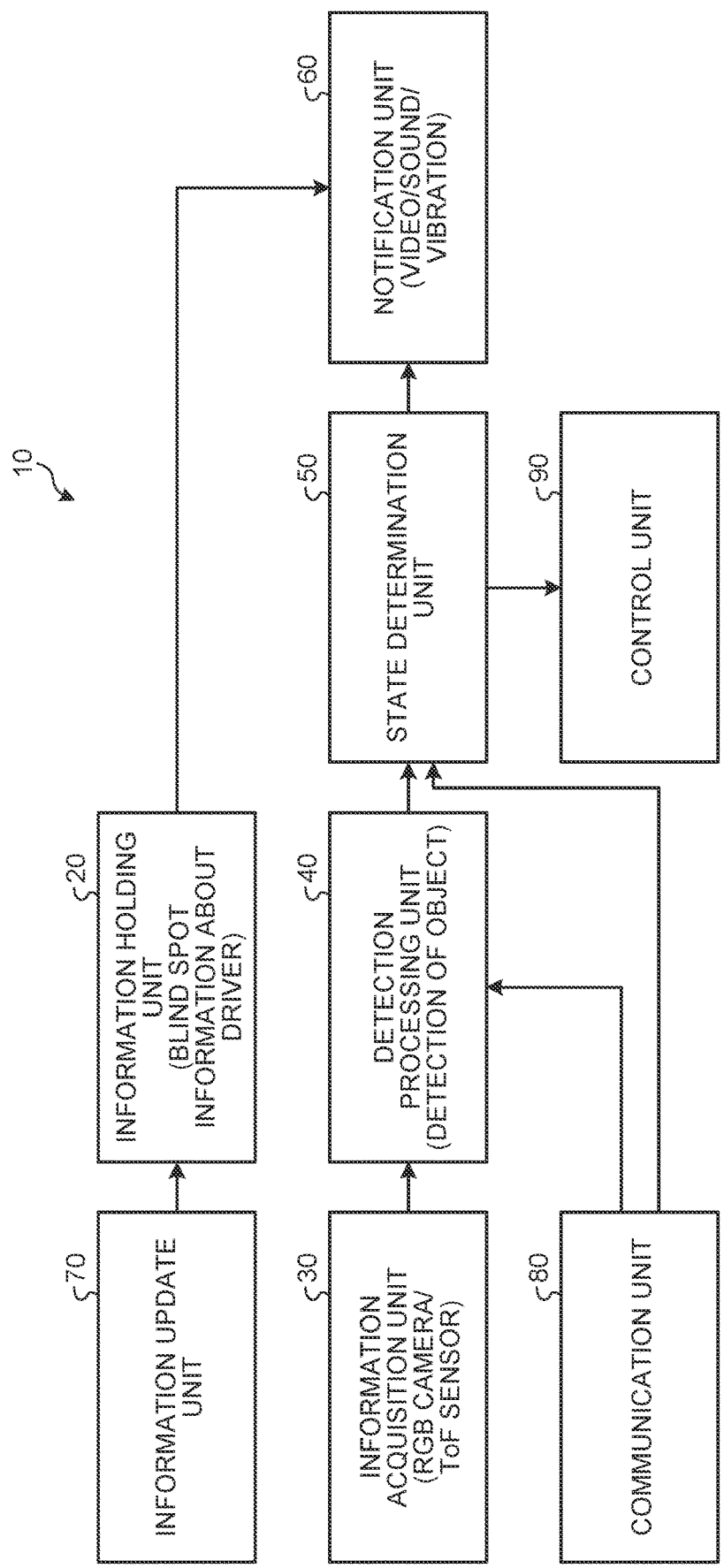
FIG. 8 is a diagram illustrating an example of a schematic configuration of an object detection system according to a second embodiment.

An exemplary configuration of the object detection system 10 according to the present embodiment will be described with reference to FIG. 8. FIG. 8 is a diagram illustrating an example of a schematic configuration of the object detection system 10 according to the present embodiment.

As illustrated in FIG. 8, the object detection system 10 according to the present embodiment includes an information update unit 70, a communication unit 80, and a control unit 90, in addition to the information holding unit 20, the information acquisition unit 30, the detection processing unit 40, the state determination unit 50, and the notification unit 60 according to the first embodiment. The communication unit 80 corresponds to a transmission unit and a reception unit.

The information update unit 70 updates the blind spot information held in the information holding unit 20. For example, the information update unit 70 updates the blind spot information, on the basis of all or any (one or two) of a state of the excavator 100, a state of the driver, and the surroundings situation information. For example, the information update unit 70 updates the blind spot information according to the state of the excavator 100, for example, an operation state where the excavator 100 is partially operated. The excavator 100 is a construction machine in which the arm 105 is movable and the cabin 110 is rotated, and the information update unit 70 updates the blind spot information according to the operation state where the arm 105 is operated or an operation state where the cabin 110 is rotated. In addition, the information update unit 70 updates the blind spot information according to the state of the driver, for example, the head position (e.g., sitting height, posture, or the like), face direction, gaze direction (visual line direction), and the like of the driver. Furthermore, the information update unit 70 updates the blind spot information according to the surroundings situation information, for example, the obstacle, such as a wall, or a building, or inclination of a road surface.

As a specific example, the information update unit 70 is implemented by an arithmetic device provided with a software program for calculation of the blind spot area that is the blind spot of the excavator 100. The blind spot area is calculated on the basis of both or one of control information about the angle of the arm 105 of the excavator 100 or the angle of a rotation direction of the cabin 110, and the gaze direction of the driver acquired from an image obtained by the imaging unit 111. In calculation of the blind spot area, change/movement of the blind spot area based on the head position of the driver may also be considered.

The communication unit 80 is a communication interface for communicating with another device. The communication unit 80 includes, for example, wireless communication modules such as Wi-Fi (registered trademark) and Bluetooth (registered trademark). The communication unit 80 enables communication between a plurality of construction machines or vehicles. This configuration makes it possible for the construction machines and vehicles to share information with each other and perform cooperative operation. In other words, the excavator 100, other construction machines, vehicles, and the like (e.g., excavator, bulldozer, crane, dump, and the like) each have the object detection system 10, and are configured to transmit and receive (communicate) various information via both or one of a wireless network and wired network (communication network).

Here, the communication unit 80 may be configured to connect to the network by using a radio access technology (RAT) such as Long Term Evolution (LTE) or New Radio (NR), in addition to the Wi-Fi (registered trademark) and Bluetooth (registered trademark). Furthermore, the communication unit 80 may be configured to use a radio access technology different from the radio access technology described above. For example, the communication unit 80 may be configured to use NR and Wi-Fi, or may be configured to use different cellular communication technologies (e.g., LTE and NR).

Note that, for example, the network may include a communication network such as, a local area network (LAN), a wide area network (WAN), a cellular network, a fixed telephone network, or a regional Internet Protocol (IP) network, or the Internet. The network may include a wireless network or a wired network. In addition, the network may include a core network. The core network is, for example, an evolved packet core (EPC) or a 5G core network (5GC). In addition, the network may include a data network other than the core network. For example, the data network may be a service network of a telecommunications carrier, for example, an IP multimedia subsystem (IMS) network. Furthermore, the data network may be a private network such as a field communication network.

The control unit 90 controls a specific operation of the excavator 100 according to a result of determination that the object is in the dangerous state. For example, when the object is in the dangerous state, the control unit 90 stops or restricts the specific operation. Examples of the specific operation include an operation of the arm 105, a rotation operation (swing operation) of the cabin 110, and forward and backward or rightward and leftward operation of the excavator 100. In a specific example, the control unit 90 is implemented by an arithmetic device provided with a software program for instructing the excavator 100 to perform an operation (e.g., stop or restriction of operation). Note that the control unit 90 includes, for example, the controller 114 (see FIG. 1). The controller 114 is a device that mainly controls the movement of the excavator 100. For example, the controller 114 also controls a control valve, a gate lock valve, an engine control device, or the like that controls a flow of hydraulic oil in a hydraulic system.

2-2. Example of Blind Spot Information Update Process

Figure 9:
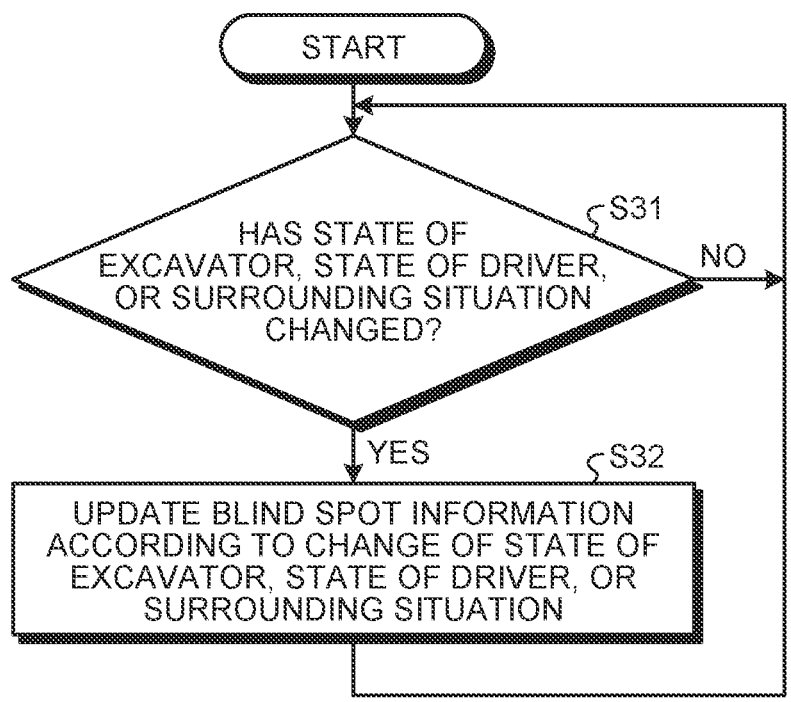
FIG. 9 is a flowchart illustrating an example of a blind spot information update process according to the second embodiment.

An example of a blind spot information update process according to the present embodiment will be described with reference to FIG. 9. FIG. 9 is a flowchart illustrating an example of the blind spot information update process according to the present embodiment.

As illustrated in FIG. 9, in Step S31, the information update unit 70 determines whether the state of the excavator 100, the state of the driver, or the surrounding situation has changed. When the information update unit 70 determines that the state of the excavator 100, the state of the driver, or the surrounding situation has changed (Yes in Step S31), in Step S32, the blind spot information held by the information holding unit 20 is updated according to the change of the state of the excavator 100, the state of the driver, or the surrounding situation. On the other hand, when the information update unit 70 determines that the state of the excavator 100, the state of the driver, or the surrounding situation has not changed (No in Step S31), the information update unit 70 returns the process to Step S31.

According to such blind spot information update process, when the state of the excavator 100, the state of the driver, or the surrounding situation is changed, the blind spot information is updated according to the change. For example, although the blind spot of the excavator 100 changes according to the operation state where the arm 105 or the cabin 110 is operated, the blind spot information is updated on the basis of the control information about the arm 105 or the cabin 110. Furthermore, for example, the blind spot of the driver changes according to the head position, face direction, gaze direction, or the like of the driver, and further according to the obstacle, such as the wall, or the building, inclination of the road surface, or the like, but the blind spot information is updated on the basis of these information (e.g., image information related thereto). In this way, updating the blind spot information according to the change of the state of the excavator 100, state of the driver, or surrounding situation enables use of appropriate blind spot information. Therefore, it is possible to appropriately notify both or one of the driver and the surroundings around the excavator 100 that the object is at the position of the blind spot of the excavator 100.

2-3. Example of Specific Operation Stop Process

Figure 10:
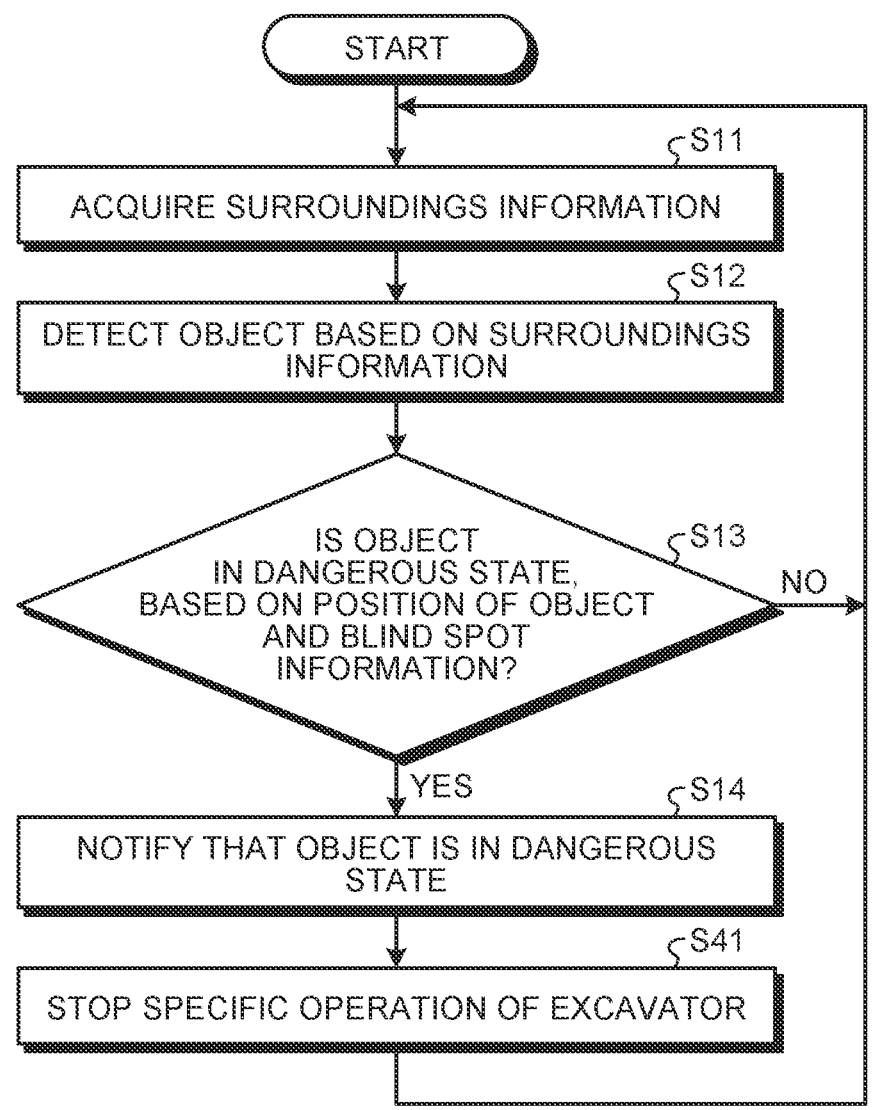
FIG. 10 is a flowchart illustrating an example of a specific operation stop process according to the second embodiment.

Next, an example of a specific operation stop process according to the present embodiment will be described with reference to FIG. 10. FIG. 10 is a flowchart illustrating an example of the specific operation stop process according to the present embodiment.

As illustrated in FIG. 10, in Step S11, the information acquisition unit 30 acquires the surroundings situation information. In Step S12, the detection processing unit 40 detects the object on the basis of the surroundings situation information. In Step S13, the state determination unit 50 determines whether the object is in the dangerous state where the object is in the blind spot area, on the basis of the position information of the object and the blind spot information. When the state determination unit 50 determines that the object is in the dangerous state (Yes in Step S13), the notification unit 60 notifies that the object is in the dangerous state in Step S14. Then, in Step S41, the control unit 90 stops the specific operation of the excavator 100. On the other hand, when the state determination unit 50 determines that the object is not in the dangerous state (No in Step S13), the process returns to Step S11.

According to such specific operation stop process, when the object is in the dangerous state where the object is in the blind spot area, the notification unit 60 notifies, for example, the driver or the surroundings around the excavator 100 (e.g., the person in the blind spot area or other surrounding persons, or the like) that the object is in the dangerous state, and further the specific operation of the excavator 100 is also stopped by the control unit 90. This configuration makes it possible to suppress approaching of a part of the excavator 100 (e.g., the arm 105, the bucket 106, or the like) to the object. Note that after the specific operation is stopped, the specific operation may be restricted. After this restriction, for example, when the object is no longer in the dangerous state, the restriction of the specific operation is released.

2-4. Example of Surroundings Situation Information Transmission Process

Figure 11:
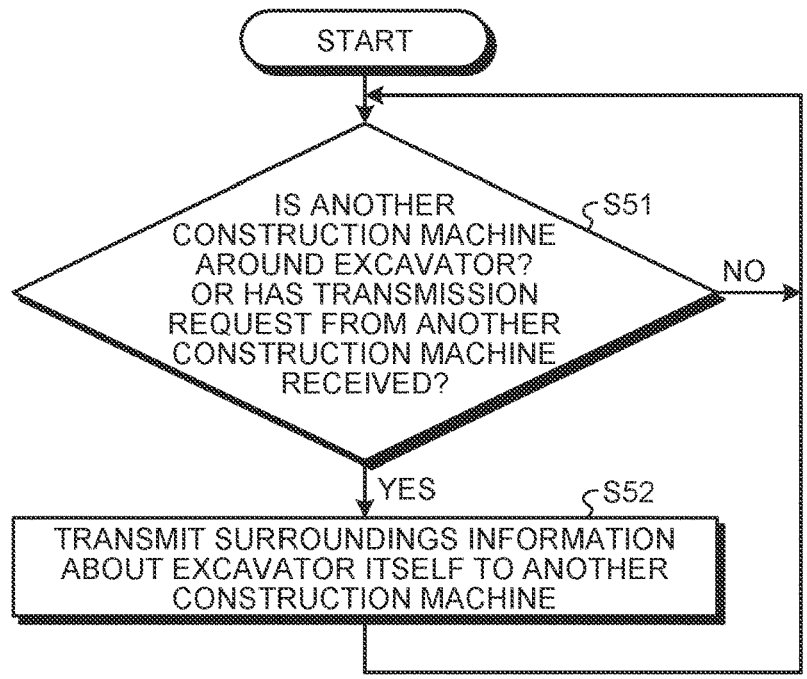
FIG. 11 is a flowchart illustrating an example of a surroundings situation information transmission process according to the second embodiment.

An example of a surroundings situation information transmission process according to the present embodiment will be described with reference to FIG. 11. FIG. 11 is a flowchart illustrating an example of the surroundings situation information transmission process according to the present embodiment.

As illustrated in FIG. 11, in Step S51, the detection processing unit 40 determines whether another construction machine is around the excavator 100, or the communication unit 80 determines whether a transmission request has been received from the another construction machine. When the detection processing unit 40 determines that the another construction machine is around the excavator 100 or the communication unit 80 determines that the transmission request has been received from the another construction machine (Yes in Step S51), the communication unit 80 transmits the surroundings situation information about the excavator 100 itself to the another construction machine in Step S52. On the other hand, when the detection processing unit 40 determines that the another construction machine is not around the excavator 100 or the communication unit 80 determines that no transmission request has been received from the another construction machine (No in Step S51), the process returns to Step S51.

According to such surroundings situation information transmission process, when the another construction machine is around the excavator 100, or when the transmission request (transmission request for requesting transmission of the surroundings situation information about the excavator 100) is received from the another construction machine, the surroundings situation information about the excavator 100 itself is transmitted to the another construction machine by the communication unit 80. This configuration makes it possible to detect a surrounding object by using the surroundings situation information about the excavator 100 transmitted from the excavator 100 (e.g., the image information), in addition to surroundings situation information about the another construction machine. Note that the object detection system 10 is also applied to the another construction machine. In addition, the vehicle may be used instead of the another construction machine, where the vehicle is provided with the object detection system 10 as well.

Note that although the communication unit 80 transmits the surroundings situation information about the excavator 100 itself to the another construction machine, the present invention is not limited thereto, and for example, the communication unit 80 may transmit notification of a dangerous state where an object is in a blind spot area of the another construction machine, to another driving target. In this configuration, in the object detection system 10, the information holding unit 20 holds the blind spot information of the another construction machine, the information processing unit 40 and the state determination unit 50 perform detection processing and determination processing on the basis of the blind spot information and the surroundings situation information (e.g., the image information or the like), and the communication unit 80 transmits, according to a result of the determination, that the article is in the blind spot area of the another construction machine, to the another construction machine. Specifically, the object detection system 10 detects the object in an area that cannot be detected by a sensor mounted on the another construction machine by using the sensor (e.g., each of the cameras 111a, 111b, and 111c of the imaging unit 111) mounted on the excavator 100, and notifies the other construction machine that the object is in the dangerous state. In other words, a system is achieved to detect the target object in an area that cannot be detected by a sensor mounted on a first construction machine by a sensor mounted on a second construction machine, and to notify the first construction machine that the object is in the dangerous state.

2-5. Example of Surroundings Situation Information Reception Process

Figure 12:
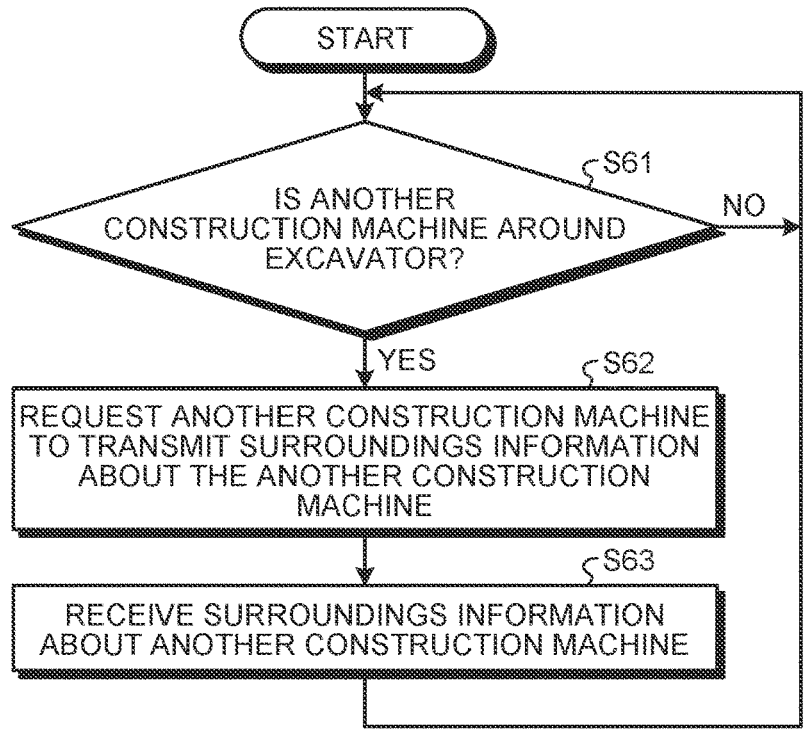
FIG. 12 is a flowchart illustrating an example of a surroundings situation information reception process according to the second embodiment.

Next, an example of a surroundings situation information reception process according to the present embodiment will be described with reference to FIG. 12. FIG. 12 is a flowchart illustrating an example of the surroundings situation information reception process according to the present embodiment.

As illustrated in FIG. 12, in Step S61, the detection processing unit 40 determines whether the another construction machine is around the excavator 100. When the detection processing unit 40 determines that the another construction machine is around the excavator 100 (Yes in Step S61), the communication unit 80 requests the another construction machine to transmit the surroundings situation information about the another construction machine (transmission request), in Step S62. Then, in Step S63, the communication unit 80 receives the surroundings situation information about the another construction machine transmitted from the another construction machine. On the other hand, when the detection processing unit 40 determines that the another construction machine is not around the excavator 100 (No in Step S61), the process returns to Step S61.

According to such surroundings situation information reception process, when the another construction machine is around the excavator 100, the transmission request for the surroundings situation information about the another construction machine is transmitted to the another construction machine by the communication unit 80, and the surroundings situation information about the another construction machine from the another construction machine is received by the communication unit 80. This configuration makes it possible for the excavator 100 to detect the surrounding objects, in addition to the surroundings situation information of the excavator 100, by using the surroundings situation information (e.g., image information, distance measurement information, or the like) about the another construction machine transmitted from the another construction machine. Furthermore, the excavator 100 is configured as well to update the blind spot information by using the surroundings situation information about the another construction machine. Note that the object detection system 10 is also applied to the another construction machine. In addition, the vehicle may be used instead of the another construction machine, where the vehicle is provided with the object detection system 10 as well.

2-6. Functions and Effects

As described above, according to the present embodiment, the same effects as those of the first embodiment can be obtained. Furthermore, the object detection system 10 further includes the information update unit 70 that updates the blind spot information. This configuration makes it possible to appropriately update the blind spot information to use the appropriate blind spot information. Therefore, it is possible to appropriately notify both or one of the driver and the surroundings around the driving target (e.g., the excavator 100) that the object is at the position of the blind spot of the driving target, that is, the object is in the dangerous state.

In addition, the driving target is a construction machine or vehicle that is partially movable, and the information update unit 70 may update the blind spot information according to an operation state where the driving target is partially operated. For example, although the blind spot of the driving target changes according to the operation state where the driving target is partially operated, the blind spot information is updated according to the operation state of part of the driving target. In this way, updating the blind spot information according to the operation state of the driving target enables use of appropriate blind spot information. Therefore, it is possible to appropriately notify both or one of the driver and the surroundings around the driving target that the object is in the dangerous state.

In addition, the driving target is a construction machine that has the arm 105 being movable, and the information update unit 70 may update the blind spot information according to the operation state where the arm 105 is operated. For example, although the blind spot of the driving target changes according to the operation state where the arm 105 is operated, the blind spot information is updated according to the operation state of the arm 105. In this way, updating the blind spot information according to the operation state of the arm 105 enables use of appropriate blind spot information. Therefore, it is possible to appropriately notify both or one of the driver and the surroundings around the driving target that the object is in the dangerous state.

In addition, the driving target is a construction machine in which a housing (e.g., the cabin 110) including the driver's seat rotates (swings), and the information update unit 70 may update the blind spot information according to an operation state where the housing is rotated. For example, although the blind spot of the driving target changes according to the operation state where the cabin 110 is operated, the blind spot information is updated according to the operation state of the cabin 110. In this way, updating the blind spot information according to the operation state of the housing enables use of appropriate blind spot information. Therefore, it is possible to appropriately notify both or one of the driver and the surroundings around the driving target that the object is in the dangerous state.

In addition, the information update unit 70 may update the blind spot information according to the head position, face direction, or the gaze direction of the driver. Therefore, updating the blind spot information according to the head position, the face direction, or the gaze direction of the driver enables use of appropriate blind spot information. Therefore, it is possible to appropriately notify both or one of the driver and the surroundings around the driving target that the object is in the dangerous state.

Furthermore, the information update unit 70 may update the blind spot information on the basis of the surroundings situation information (e.g., the obstacle or building, inclination of the road surface, or the like). Therefore, updating the blind spot information according to the surroundings situation information enables use of appropriate blind spot information. Therefore, it is possible to appropriately notify both or one of the driver and the surroundings around the driving target that the object is in the dangerous state.

Furthermore, the object detection system 10 may further include the reception unit (e.g., the communication unit 80) that receives surroundings situation information about a surrounding situation of the another driving target, transmitted from the another driving target being around the driving target, and the information update unit 70 may update the blind spot information on the basis of the surroundings situation information about the another driving target in addition to the surroundings situation information about the driving target itself. Therefore, updating the blind spot information on the basis of other surroundings situation information transmitted from the another driving target enables use of appropriate blind spot information. Therefore, it is possible to appropriately notify both or one of the driver and the surroundings around the driving target that the object is in the dangerous state.

Furthermore, the object detection system 10 may further include the control unit 90 that controls the specific operation of the driving target according to the result of determination that the object is in the dangerous state. This configuration makes it possible to control the specific operation of the driving target according to the result of determination.

Furthermore, the control unit 90 may stop or restrict the specific operation of the driving target (e.g., the operation in which the driving target or the driving target partially approaches the object) according to the result of determination. This configuration makes it possible to suppress approaching of the part of the driving target (e.g., the arm 105, the bucket 106, or the like of the excavator 100) to the object.

Furthermore, the object detection system 10 may further include the transmission unit (e.g., the communication unit 80) that transmits the surroundings situation information to the another driving target being around the driving target. This configuration makes it possible to transmit the surroundings situation information about the driving target itself to the another driving target. Therefore, the driving target having received the surroundings situation information is allowed to detect the object by using the surroundings situation information transmitted from the another driving target.

Furthermore, when the detection processing unit 40 detects presence of the another driving target around the driving target, the transmission unit may transmit the surroundings situation information to the another driving target. This configuration makes it possible to transmit the surroundings situation information to the another driving target at appropriate timing.

Furthermore, the object detection system 10 may further include the reception unit (e.g., the communication unit 80) that receives the transmission request transmitted from the another driving target being around the driving target, and the transmission unit may transmit the surroundings situation information to the another driving target in response to the transmission request. This configuration makes it possible to transmit the surroundings situation information to the another driving target at appropriate timing.

Furthermore, the object detection system 10 may further include the transmission unit (e.g., the communication unit 80) that transmits, to the another driving target being around the driving target, notification of a dangerous state where an object is in a blind spot area of the another driving target. This configuration makes it possible for the another driving target to know that the object is in the dangerous state where the object is in the blind spot area, even when the another driving target cannot detect the dangerous state where the object is in the blind spot area, by itself.

Furthermore, the object detection system 10 may further include the reception unit (e.g., the communication unit 80) that receives the surroundings situation information about the surrounding situation of the another driving target, transmitted from the another driving target being around the driving target, and the detection processing unit 40 may detect the object on the basis of the surroundings situation information about the another driving target in addition to the surroundings situation information about the driving target itself. This configuration makes it possible for the driving target to detect the object by using other surroundings situation information transmitted from the another driving target in addition to the surroundings situation information about the driving target itself. Therefore the object can be accurately and readily detected.

3. OTHER EMBODIMENTS

The processing according to the embodiments (or modifications) described above may be implemented in various different forms (modifications) in addition to the embodiments described above. For example, of the processing having been described in the above embodiments, all or part of the processing described to be automatically performed can be performed manually, or all or part of the processing described to be performed manually can be performed automatically by known methods. In addition, the processing procedures, specific names, and information including various data and parameters, which are described in the above description or illustrated in the drawings, can be appropriately changed unless otherwise specified. For example, various information illustrated in the drawings are not limited to the illustrated information.

Furthermore, the component elements of the devices are illustrated as functional concepts and are not necessarily required to be physically configured as illustrated. In other words, the specific forms of distribution or integration of the devices are not limited to those illustrated, and all or some thereof can be configured by being functionally or physically distributed or integrated, in any units, according to various loads, usage conditions, or the like.

Furthermore, the embodiments (or modifications) described above can be appropriately combined within a range consistent with the contents of the processing. Furthermore, the effects described herein are merely examples and not limited thereto, and other effects may also be provided.

4. EXEMPLARY HARDWARE CONFIGURATION

Figure 13:
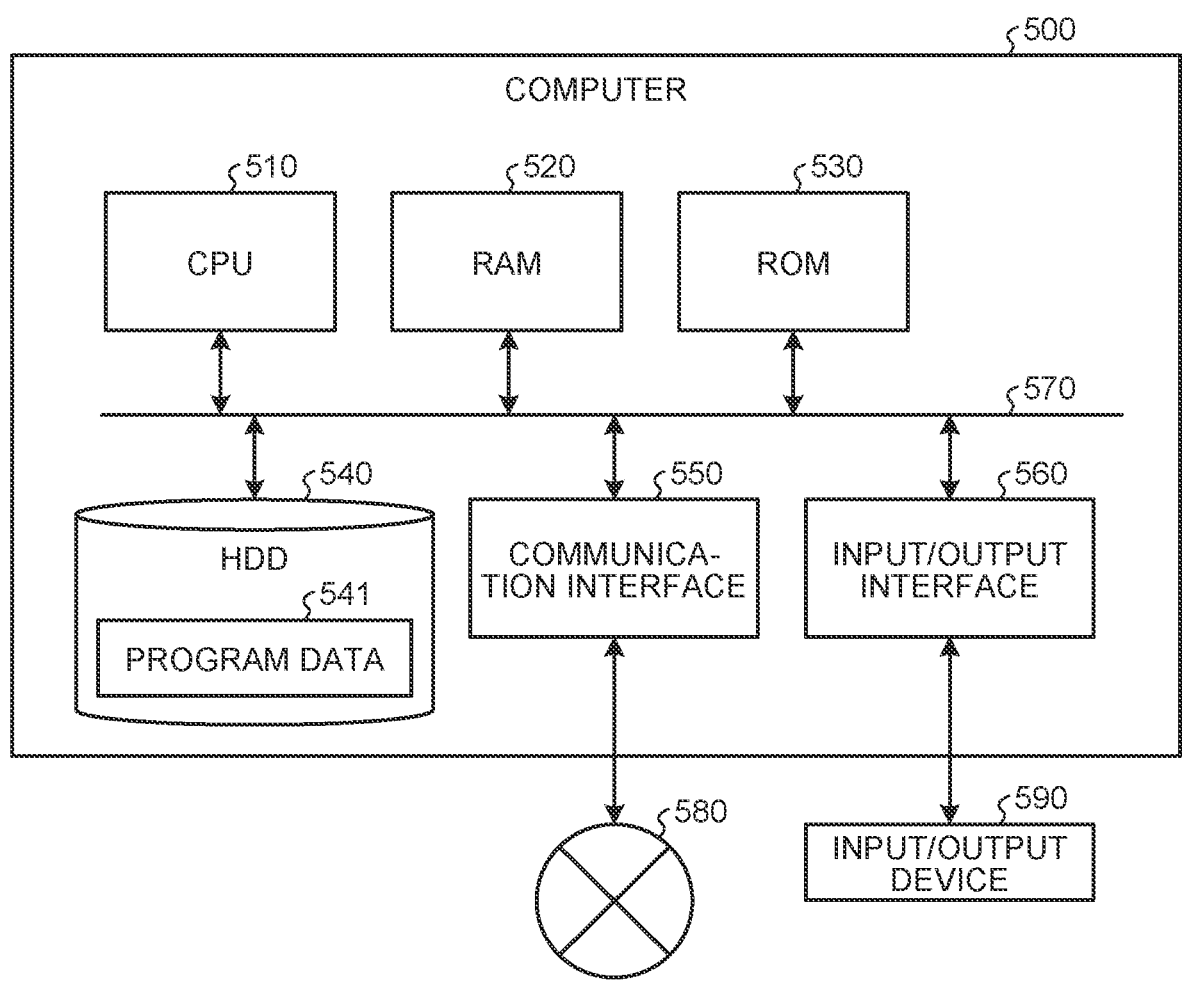
FIG. 13 is a diagram illustrating an example of a schematic configuration of hardware.

A specific exemplary hardware configuration of the object detection system 10 and the like according to the embodiments (or modifications) described above will be described. Functions of the object detection system 10 and the like according to an embodiment (or modification) may be implemented by, for example, a computer 500 that has a configuration as illustrated in FIG. 13. FIG. 13 is a diagram illustrating the exemplary hardware configuration implementing functions of the object detection system 10 and the like according to an embodiment (or modification).

As illustrated in FIG. 13, the computer 500 includes a CPU 510, a RAM 520, a read only memory (ROM) 530, a hard disk drive (HDD) 540, a communication interface 550, and an input/output interface 560. The respective units of the computer 500 are connected by a bus 570.

The CPU 510 is operated on the basis of programs stored in the ROM 530 or the HDD 540 and controls the respective units. For example, the CPU 510 deploys the programs stored in the ROM 530 or the HDD 540 to the RAM 520 and executes processing corresponding to various programs.

The ROM 530 stores a boot program, such as a basic input output system (BIOS), executed by the CPU 510 when the computer 500 is booted, a program depending on the hardware of the computer 500, and the like.

The HDD 540 is a recording medium that is readable by the computer 500 to non-transitorily record the programs executed by the CPU 510, data used by the programs, and the like. Specifically, the HDD 540 is a recording medium that records an information processing program according to the present disclosure that is an example of program data 541.

The communication interface 550 is an interface for connecting the computer 500 to an external network 580 (e.g., the Internet). For example, the CPU 510 receives data from another device or transmits data generated by the CPU 510 to another device, via the communication interface 550.

The input/output interface 560 is an interface for connecting an input/output device 590 and the computer 500. For example, the CPU 510 receives data from an input device such as a keyboard or mouse via the input/output interface 560. In addition, the CPU 510 transmits data to an output device such as a display, speaker, or printer via the input/output interface 560.

Note that the input/output interface 560 may function as a media interface for reading of a program or the like recorded on a predetermined recording medium. The media includes, for example, an optical recording medium such as a digital versatile disc (DVD) or phase change rewritable disk (PD), a magneto-optical recording medium such as a magneto-optical disk (MO), a tape medium, a magnetic recording medium, a semiconductor memory, or the like.

Here, for example, in a case where the computer 500 functions as an information device of the object detection system 10 according to an embodiment (or modification), the CPU 510 of the computer 500 executes the information processing program loaded into the RAM 520, thereby implementing all or some of the functions of the respective units of the object detection system 10 according to the embodiment (or modification). Furthermore, the HDD 540 stores various programs and various data according to the present disclosure. Note that the CPU 510 executes the program data 541 read from the HDD 540, but in another example, the CPU 510 may acquire programs from other devices via the external network 580.

5. SUPPLEMENTARY NOTE

Note that the present technology can also have the following configurations.

(1)

An object detection system comprising:

an information holding unit that holds blind spot information about a blind spot area being a blind spot of a driving target being a construction machine or a vehicle;

an information acquisition unit that acquires surroundings situation information about a surrounding situation of the driving target;

a detection processing unit that detects an object based on the surroundings situation information;

a state determination unit that determines that the object is in a dangerous state where the object is in the blind spot area, based on position information of the object detected and the blind spot information; and a notification unit that notifies both or one of a driver who drives the driving target and surroundings around the driving target that the object is in the dangerous state, according to a result of determination that the object is in the dangerous state.

(2)
The object detection system according to (1) described above, wherein
the dangerous state includes a state where the object is within a predetermined distance from the driving target, in addition to a state where the object is in the blind spot area.

(3)
The object detection system according to (1) or (2) described above, wherein
the dangerous state includes a state where the driving target is approaching the object, in addition to a state where the object is in the blind spot area.

(4)
The object detection system according to any of (1) to (3) described above, wherein
the notification unit changes a level of notification representing that the object is in the dangerous state, according to a separation distance between the driving target and the object.

(5)
The object detection system according to any of (1) to (4) described above, wherein
the notification unit changes a level of notification representing that the object is in the dangerous state, according to whether the object is a person or other than the human.

(6)
The object detection system according to any of (1) to (5) described above, further comprising
an information update unit that updates the blind spot information.

(7)
The object detection system according to (6) described above, wherein
the driving target is a construction machine or vehicle that is partially movable, and
the information update unit updates the blind spot information according to an operation state of partly operation of the driving target.

(8)
The object detection system according to (7) described above, wherein
the driving target is a construction machine that has an arm being movable, and
the information update unit updates the blind spot information according to an operation state where the arm is operated.

(9)
The object detection system according to (7) described above, wherein
the driving target is a construction machine in which a housing including a driver's seat rotates, and
the information update unit updates the blind spot information according to an operation state where the housing is rotated.

(10)
The object detection system according to any of (6) to (9) described above, wherein
the information update unit updates the blind spot information according to a head position, face direction, or gaze direction of the driver.

(11)
The object detection system according to any of (6) to (10) described above, wherein
the information update unit updates the blind spot information based on the surroundings situation information.

(12)
The object detection system according to (11) described above, further comprising
a reception unit that receives surroundings situation information about a surrounding situation of another driving target, transmitted from the another driving target being around the driving target,
wherein the information update unit updates the blind spot information based on the surroundings situation information about the another driving target, in addition to the surroundings situation information about the driving target.

(13)
The object detection system according to any of (1) to (12) described above, further comprising
a control unit that controls a specific operation of the driving target according to the result of determination.

(14)
The object detection system according to (13) described above, wherein
the control unit stops or restricts the specific operation of the driving target according to the result of determination.

(15)
The object detection system according to any of (1) to (14) described above, further comprising
a transmission unit that transmits the surroundings situation information to another driving target being around the driving target.

(16)
The object detection system according to (15) described above, wherein
the transmission unit transmits the surroundings situation information to the another driving target, when the detection processing unit detects presence of the another driving target around the driving target.

(17)
The object detection system according to (15) described above, further comprising
a reception unit that receives a transmission request transmitted from the another driving target, wherein
the transmission unit transmits the surroundings situation information to the another driving target, in response to the transmission request.

(18)
The object detection system according to any of (1) to (17) described above, further comprising
a transmission unit that transmits, to another driving target being around the driving target, notification of a dangerous state where an object is in a blind spot area of the another driving target.

(19)
The object detection system according to any of (1) to (18) described above, further comprising
a reception unit that receives surroundings situation information about a surrounding situation of another driving target, transmitted from the another driving target being around the driving target, wherein
the detection processing unit detects the object based on the surroundings situation information about the another driving target, in addition to the surroundings situation information about the driving target.

(20)

An object detection method comprising:
holding blind spot information about a blind spot area being a blind spot of a driving target being a construction machine or a vehicle;
acquiring surroundings situation information about a surrounding situation of the driving target;
detecting an object based on the surroundings situation information;
determining that the object is in a dangerous state where the object is in the blind spot area, based on position information of the object detected and the blind spot information; and
notifying both or one of a driver who drives the driving target and surroundings around the driving target that the object is in the dangerous state, according to a result of determination that the object is in the dangerous state.

(21)

An object detection method including using the object detection system according to any of (1) to (19) described above.

(22)

An information processing apparatus including a component element related to the object detection system according to any of (1) to (19) described above.

REFERENCE SIGNS LIST

10 OBJECT DETECTION SYSTEM
20 INFORMATION HOLDING UNIT
30 INFORMATION ACQUISITION UNIT
40 DETECTION PROCESSING UNIT
50 STATE DETERMINATION UNIT
60 NOTIFICATION UNIT
70 INFORMATION UPDATE UNIT
80 COMMUNICATION UNIT
90 CONTROL UNIT
100 EXCAVATOR
101 CARRIAGE
102 SWING MECHANISM
103 SWING BODY
104 BOOM
105 ARM
106 BUCKET
107 BOOM CYLINDER
108 ARM CYLINDER
109 BUCKET CYLINDER
110 CABIN
111 IMAGING UNIT
111a CAMERA
111b CAMERA
111c CAMERA
112 INPUT UNIT
113 OUTPUT UNIT
114 CONTROLLER
200 FORKLIFT
201 LIFT
500 COMPUTER
A1 DETECTION AREA
A2 DETECTION AREA

The invention claimed is:

1. An object detection system comprising:
an information holding unit that holds blind spot information about a blind spot area being a blind spot of a driving target being a construction machine or a vehicle;
an information acquisition unit that acquires surroundings situation information about a surrounding situation of the driving target;
a detection processing unit that detects an object based on the surroundings situation information;
a state determination unit that determines that the object is in a dangerous state where the object is in the blind spot area, based on position information of the object detected and the blind spot information;
a notification unit that notifies both or one of a driver who drives the driving target and surroundings around the driving target that the object is in the dangerous state, according to a result of determination that the object is in the dangerous state;
a reception unit that receives surroundings situation information about a surrounding situation of another driving target, transmitted from the another driving target that is around the driving target; and
an information update unit that updates the blind spot information based on the surroundings situation information of the another driving target, in addition to the surroundings situation information of the driving target.

2. The object detection system according to claim 1, wherein
the dangerous state includes a state where the object is within a predetermined distance from the driving target, in addition to a state where the object is in the blind spot area.

3. The object detection system according to claim 1, wherein
the dangerous state includes a state where the driving target is approaching the object, in addition to a state where the object is in the blind spot area.

4. The object detection system according to claim 1, wherein
the notification unit changes a level of notification representing that the object is in the dangerous state, according to a separation distance between the driving target and the object.

5. The object detection system according to claim 1, wherein
the notification unit changes a level of notification representing that the object is in the dangerous state, according to whether the object is a person or not.

6. The object detection system according to claim 1, wherein
the driving target is a construction machine or vehicle that is partially movable, and
the information update unit updates the blind spot information according to an operation state of partly operation of the driving target.

7. The object detection system according to claim 6, wherein
the driving target is a construction machine that has an arm being movable, and
the information update unit updates the blind spot information according to an operation state where the arm is operated.

8. The object detection system according to claim 6, wherein
the driving target is a construction machine in which a housing including a driver's seat rotates, and
the information update unit updates the blind spot information according to an operation state where the housing is rotated.

9. The object detection system according to claim 1, wherein
the information update unit updates the blind spot information according to a head position, face direction, or gaze direction of the driver.

10. The object detection system according to claim 1, further comprising
a control unit that controls a specific operation of the driving target according to the result of determination.

11. The object detection system according to claim 10, wherein
the control unit stops or restricts the specific operation of the driving target according to the result of determination.

12. The object detection system according to claim 1, further comprising
a transmission unit that transmits the surroundings situation information to another driving target being around the driving target.

13. The object detection system according to claim 12, wherein
the transmission unit transmits the surroundings situation information to the another driving target, when the detection processing unit detects presence of the another driving target around the driving target.

14. The object detection system according to claim 12, further comprising
a reception unit that receives a transmission request transmitted from the another driving target, wherein
the transmission unit transmits the surroundings situation information to the another driving target, in response to the transmission request.

15. The object detection system according to claim 1, further comprising
a transmission unit that transmits, to another driving target being around the driving target, notification of a dangerous state where an object is in a blind spot area of the another driving target.

16. The object detection system according to claim 1, further comprising wherein
the detection processing unit detects the object based on the surroundings situation information of the another driving target, in addition to the surroundings situation information of the driving target.

17. An object detection method comprising:
holding blind spot information about a blind spot area being a blind spot of a driving target being a construction machine or a vehicle;
acquiring surroundings situation information about a surrounding situation of the driving target;
detecting an object based on the surroundings situation information;
determining that the object is in a dangerous state where the object is in the blind spot area, based on position information of the object detected and the blind spot information;
notifying both or one of a driver who drives the driving target and surroundings around the driving target that the object is in the dangerous state, according to a result of determination that the object is in the dangerous state; and
receiving surroundings situation information about a surrounding situation of another driving target, transmitted from the another driving target that is around the driving target; and
updating the blind spot information based on the surroundings situation information of the another driving target, in addition to the surroundings situation information of the driving target.

18. A non-transitory computer readable medium storing a program, the program being executable by a processor to perform operations comprising:
holding blind spot information about a blind spot area being a blind spot of a driving target being a construction machine or a vehicle;
acquiring surroundings situation information about a surrounding situation of the driving target;
detecting an object based on the surroundings situation information;
determining that the object is in a dangerous state where the object is in the blind spot area, based on position information of the object detected and the blind spot information;
notifying both or one of a driver who drives the driving target and surroundings around the driving target that the object is in the dangerous state, according to a result of determination that the object is in the dangerous state; and
receiving surroundings situation information about a surrounding situation of another driving target, transmitted from the another driving target that is around the driving target; and
updating the blind spot information based on the surroundings situation information of the another driving target, in addition to the surroundings situation information of the driving target.

* * * * *